UNITED STATES PATENT OFFICE.

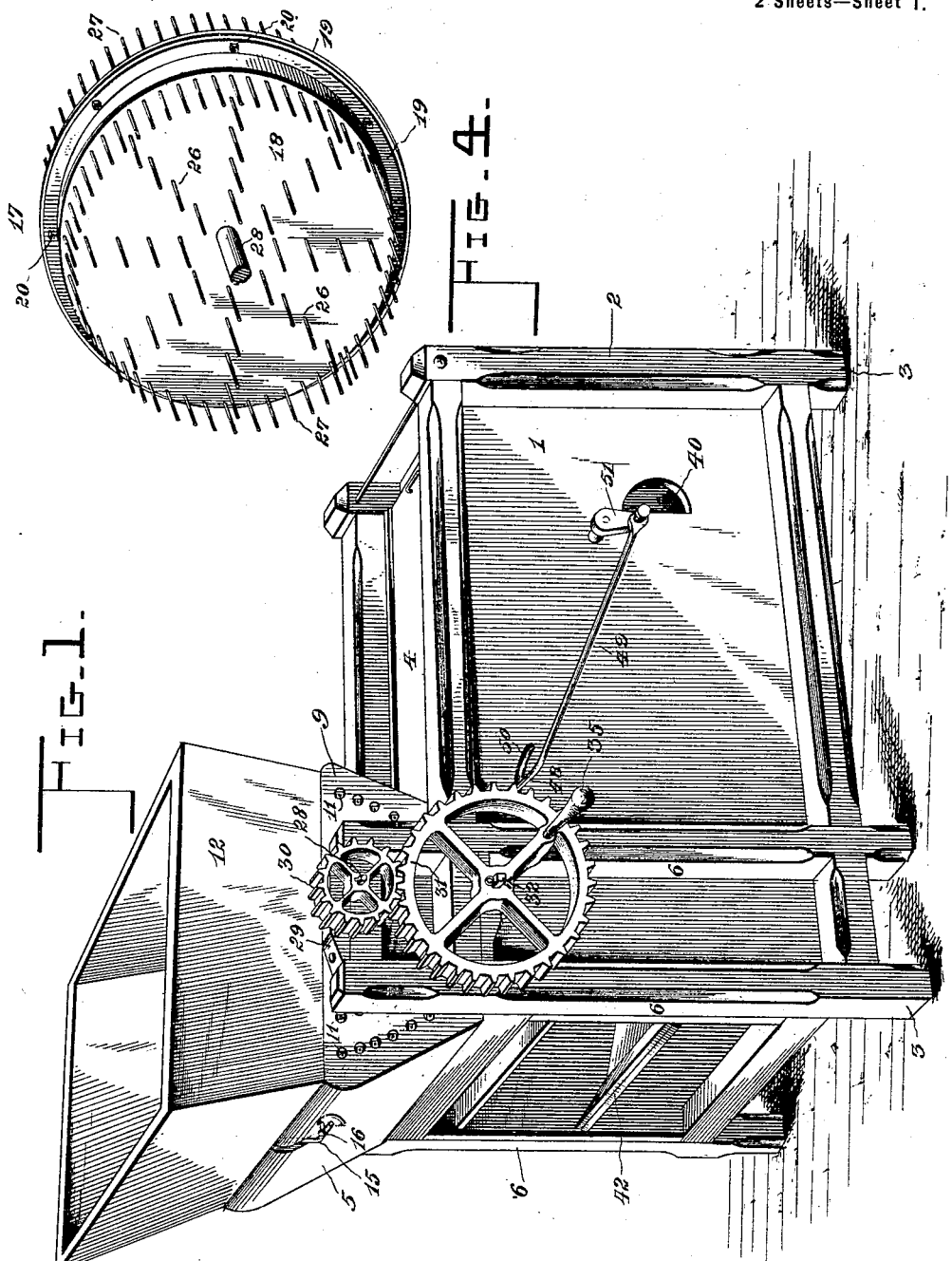

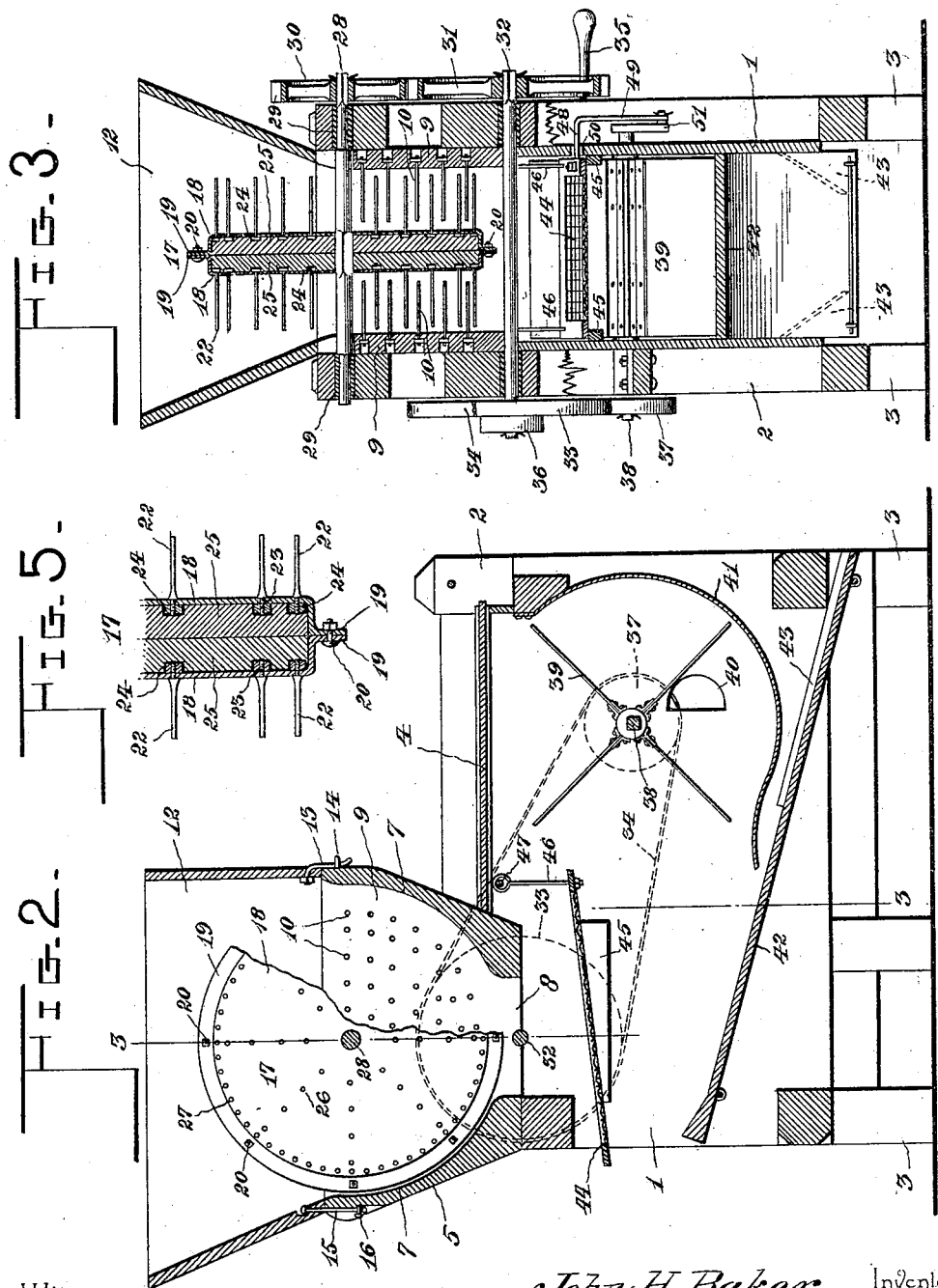

JOHN H. BAKER, OF SPIVEY, TENNESSEE.

PEA OR BEAN SEPARATOR.

SPECIFICATION forming part of Letters Patent No. 631,946, dated August 29, 1899.

Application filed November 30, 1898. Serial No. 697,872. (No model.)

*To all whom it may concern:*

Be it known that I, JOHN H. BAKER, a citizen of the United States, residing at Spivey, in the county of Clay and State of Tennessee, have invented a new and useful Pea or Bean Separator, of which the following is a specification.

This invention relates to machines for threshing and hulling peas, beans, and the like; and it has for its object to provide a simple and efficient machine of this character having improved means for thoroughly threshing and cleaning the product without breaking or cracking the same.

To this end the invention contemplates an improved construction of threshing mechanism for hulling peas, beans, and the like in connection with means for effecting a complete separation of the hulls and trash from the product before delivering the same from the machine.

With these and other objects in view, which will readily appear as the nature of the invention is better understood, the same consists in the novel construction, combination, and arrangement of parts hereinafter more fully described, illustrated, and claimed.

While the essential and characteristic features of the invention are necessarily susceptible of modification, still the preferred embodiment of the invention is illustrated in the accompanying drawings, in which—

Figure 1 is a perspective view of a separating or threshing machine constructed in accordance with the present invention. Fig. 2 is a vertical longitudinal sectional view of the machine. Fig. 3 is a vertical transverse sectional view on the line 3 3 of Fig. 2. Fig. 4 is a detail in perspective of the threshing or hulling wheel. Fig. 5 is a detail sectional view of a portion of the threshing or hulling wheel.

Referring to the accompanying drawings, the numeral 1 designates the casing of the machine, built within a suitable exterior framework 2, having short pendent legs 3, providing a support for the machine, and said casing 1 essentially consists of opposite inclosing sides and a slide-top 4, mounted in suitable ways in the top of the casing and affording convenient means for gaining access to the interior parts within the casing for the purpose of cleaning or adjusting the same.

The machine-casing 1 supports on top thereof at one end a segmental concave boxing 5, preferably bolted or otherwise firmly secured in place between upright post extensions 6 of the exterior framework 2 of the casing. The concave boxing 5 is provided with a curved shell 7, having a bottom discharge-opening 8 communicating directly with the interior of the machine-casing near one end thereof, and said curved shell 7 of the boxing is confined between the opposite straight side walls 9 thereof, and said straight side walls 9 of the concave boxing 5 have projected inwardly within the boxing a plurality of closely-arranged stationary teeth 10. The teeth 10, which project inwardly from the opposite side walls 9 of the concave boxing, have their outer ends bolted, as at 11, in said side walls, so that the same can be removed and replaced at any time required.

The space above the concave boxing 5 is inclosed by a detachable hopper 12, consisting of a flaring frame resting directly on top of the boxing 5 and provided at one end with a pair of hooks 13, having a detachable hinge engagement with the eyes 14, fitted to one end of the concave boxing 5, this connection between the boxing and the hopper permitting the latter to be swung on the hooks 13 as a hinge, so as to expose the threshing mechanism whenever necessary. At the end opposite the hinge-hooks 13 the hopper 12 is provided with a pivotal L-shaped latch 15, adapted to be turned in and out of engagement with a pin or stud 16, projecting from one end of the concave boxing. The latch 15 serves to lock the hopper on the concave boxing while at the same time permitting it to be raised whenever required, and at this point it will be observed that the hopper 12 not only serves to receive the supply of peas or beans to be threshed, but at the same time forms a part of the housing for the vertically-disposed threshing or hulling wheel 17, mounted to turn within the concave boxing.

The threshing or hulling wheel 17 rotates between the stationary teeth 10, projected from the opposite walls 9 of the boxing 5, and said wheel essentially comprises a pair of duplicate circular disks 18, arranged back to back and having peripheral abutting flanges 19 receiving the securing-bolts 20 for holding the two disks together to form the complete body of the wheel 17. The duplicate registering disks 18 are preferably made of sheet-iron of a suitable thickness, and each of said disks carries a plurality of laterally-extending threshing spikes or teeth 22, which work through the spaces between the stationary teeth 10 of the concave boxing. The threshing spikes or teeth 22, which are projected laterally from each of the wheel-disks 18, are provided with inner bolt ends 23, which pass through openings formed in the disk and receive thereon the fastening-nuts 24, arranged at the inner side of the disk, and are therefore housed entirely within the wheel. After the threshing spikes or teeth have been inserted in each wheel-disk from the outside thereof and bolted thereto in the manner explained wooden filling-blocks 25 are placed within the inner sides of the wheel-disks over the nuts 24, so that when the two disks are bolted together a loosening or falling out of the spikes or teeth is positively prevented, while at the same time the separable wheel may be readily opened up whenever it is necessary to remove and replace a broken spike or tooth. By reason of the construction of threshing or hulling wheel described it will be observed that the spikes or teeth project horizontally and laterally from opposite sides thereof, and an essential feature of the invention is the relative arrangement of these teeth at each side of the wheel.

As shown in Fig. 4 of the drawings, the threshing spikes or teeth projecting from each disk or side of the wheel 17 are grouped into a series of radial rows 26, all of which converge toward the axis of the wheel and into a circular peripheral row 27. The circular peripheral rows 27 of the threshing spikes or teeth at each side of the wheel 17 are arranged near the peripheral edge of the wheel and exterior to the radial rows 26, so as to completely encircle the latter, and the purpose of the circular peripheral rows 27 of the threshing spikes or teeth is to retain or hold the peas or beans within the working area of the wheel until the hulls are completely broken and threshed therefrom.

The threshing or hulling wheel 17 is mounted on a transverse wheel-shaft 28, journaled in suitable bearings 29 at opposite sides of the boxing 5 and carrying upon one end the pinion 30, meshing with a spur-gear 31, mounted on one end of the transverse drive-shaft 32, mounted transversely of the machine-frame and carrying on the end opposite the spur-gear 31 a belt-wheel 33, which communicates motion to a drive-belt 34, while motion is communicated to the shaft 32 by means of a crank 35 or by power through the medium of a belt applied to a belt-pulley 36, also mounted on the shaft 32. The belt 34 passes over a belt-pulley 37, mounted on one end of the fan-shaft 38, journaled transversely of the machine-casing at one end thereof and carrying within the casing a blast-fan 39. The said blast-fan 39 receives its supply of air from the inlet-eyes 40, formed in opposite sides of the machine-casing 1, and works within the fan casing or rim 41, built within one end of the machine-casing and serving to deflect the blast forward through the machine-casing over the inclined chute-board 42, extending lengthwise thereof from end to end. The inclined chute-board 42 extends below the fan casing or rim 41 and is provided at its lower end with a contracted chute portion 43 for the delivery of the hulls and cleaned peas or beans into a suitable receptacle therefor. The upper or higher end of the inclined chute-board 42, which is arranged beyond the fan 39, is disposed below a shaking-riddle 44. The riddle 44 is slidably supported at an inclination or in suitable supports 45, fitted at opposite inner sides of the machine-casing, and said riddle is suspended at one end from the hanger-links 46, loosely connected with a transverse supporting-rod 47, fitted in the machine-casing, and the end of the riddle which is suspended from the hanger-links 46 has connected thereto the angled end 48 of the pitman 49. The angled end of the pitman 49 works through a slot 50 in one side of the machine-casing, and the other end of said pitman connects with a crank 51 on one end of the fan-shaft 38.

The shaking-riddle 44 is arranged directly beneath the bottom discharge-opening 8 of the concave boxing 5, so that the threshed peas or beans, with their crushed and broken hulls, fall directly onto the riddle, and the blast of air from the fan will carry out the hulls and other trash through one end of the machine-casing, while the peas or beans separated therefrom by the riddle fall onto the chute-board 42 and roll down the same into the receptacle provided therefor. In this operation of the machine it will be observed that the drive-shaft 31 simultaneously communicates motion to the threshing or hulling wheel and also to the fan, while the latter through the medium of the connections described imparts an oscillating reciprocatory motion to the riddle.

From the foregoing it is thought that the construction, operation, and many advantages of the herein-described machine will be readily apparent to those skilled in the art without further description, and it will be understood that changes in the form, proportion, and the minor details of construction may be resorted to without departing from the principle or sacrificing any of the advantages of this invention.

Having thus described the invention, what is claimed as new, and desired to be secured by Letters Patent, is—

1. In a separator-machine, the combination of a casing having a concave boxing provided with stationary teeth projected inwardly from opposite sides thereof, a hopper detachably surmounting said boxing; a vertically-arranged threshing or hulling wheel working within the boxing and having duplicate circular disks arranged back to back and detachably bolted together, a plurality of spikes or teeth detachably bolted to each of said disks, an inclined chute-board forming the bottom of said casing, a shaking-riddle loosely suspended within the casing beneath the concave boxing, a blast-fan mounted for rotation within the casing beyond the riddle, and a connection between the fan-shaft and said riddle.

2. In a separator-machine, the combination with the concave having stationary teeth at opposite sides thereof, of a threshing or hulling wheel consisting of a pair of duplicate circular disks arranged back to back and detachably bolted together, and a plurality of spikes or teeth detachably bolted to each of said disks, substantially as set forth.

3. In a separator-machine, the combination with the concave, of a threshing or hulling wheel consisting of a pair of duplicate circular disks arranged back to back and provided with peripheral abutting flanges detachably bolted together, a plurality of threshing spikes or teeth having their inner ends bolted within each of said disks, and filling-blocks fitted within said disks, substantially as set forth.

In testimony that I claim the foregoing as my own I have hereto affixed my signature in the presence of two witnesses.

JOHN H. BAKER.

Witnesses:
  Y. C. CLARK,
  W. F. JENKINS.